United States Patent [19]

Spilo

[11] Patent Number: 5,740,367
[45] Date of Patent: Apr. 14, 1998

[54] METHOD AND APPARATUS FOR IMPROVING THE THROUGHPUT OF A LOCAL AREA NETWORK

[76] Inventor: Michael L. Spilo, 248 E. 31st St., New York, N.Y. 10016

[21] Appl. No.: 552,690

[22] Filed: Nov. 3, 1995

[51] Int. Cl.[6] .......................... G06F 12/08; G06F 13/14
[52] U.S. Cl. .............. 395/200.31; 395/616; 364/DIG. 1; 364/DIG. 2
[58] Field of Search ........................ 395/477, 611, 395/468, 413, 474, 418, 49.1, 617, 182.13, 608, 497.02, 445, 200.55, 726, 451, 421.03, 472, 452, 200.31; 340/825.34, 825.51; 380/23, 25, 46, 49; 364/DIG. 1, DIG. 2

[56] References Cited

U.S. PATENT DOCUMENTS

| | | | |
|---|---|---|---|
| 5,185,878 | 2/1993 | Baror et al. | 395/450 |
| 5,202,971 | 4/1993 | Henson et al. | 395/608 |
| 5,490,270 | 2/1996 | Devarakonda et al. | 395/617 |

*Primary Examiner*—Daniel H. Pan
*Attorney, Agent, or Firm*—Schweitzer Cornman Gross & Bondell LLP

[57] ABSTRACT

A method and system for improving local area network throughput and thereby reducing traffic on the network hardware, allowing more workstations to be serviced by fewer servers. A further method for creating a bi-directional distributed processing system for cooperatively improving the local area network performance. In the preferred embodiment, a method is presented allowing workstations on a network to cache locally data normally retrieved from a network server or host machine.

29 Claims, 5 Drawing Sheets

1

METHOD AND APPARATUS FOR IMPROVING THE THROUGHPUT OF A LOCAL AREA NETWORK

TECHNICAL FIELD

This invention relates to Local Area Networks and the computers connected to them. More particularly, this invention relates to the speed and efficiency of an entire Local Area Network system as a whole.

BACKGROUND OF THE INVENTION

A local area network (LAN) is a system allowing several computers to be connected to each other in order to share data and resources. A typical LAN contains computers called servers that provide data storage (file servers), centralized printer sharing (print servers), communications facilities (comm servers), or other services to other computers on the network. Frequently a server will provide several of these functions simultaneously. The non-server computers on the LAN are referred to as clients and make use of the facilities provided by the servers.

LANs have evolved such that, on what are known as peer-to-peer LANs, computers can function as both clients and servers. In such systems, a computer connected to the LAN can, for instance, provide access to its own local data or printer to other computers, thus operating as a server computer, while at the same time operating as a client, accessing file, print and other services provided by other computers connected to the LAN.

In order to distinguish between computers operating strictly as servers and those operating as clients or as client/server systems on peer-to-peer networks, we'll call the computers that provide services and do not function as clients Servers, and those computers that are strictly clients, or both client and servers, Workstations. This latter term is used so as to indicate that the data or service provided by a Server is being processed or "worked on" at this location. In some cases, such as for database servers which act as an intermediate front-end for file servers, the Server may act as a Workstation for the function for which it is providing services to other workstations.

The term Workstation generally applies to single-user microcomputer systems, and it may be convenient to think of the Workstations discussed below as such in order to follow this discussion at a more simple level. It should be clear, however, that large mainframe computers could function as Workstations for the purposes of this discussion. The methodology used and discussed in this invention also applies to more complex LAN systems in which the servers and clients for various operations are mainframe computers or even complete LANs.

As networking and internetworking has become more prevalent, traffic on LANs has increased, causing slower performance at Workstations. The performance degradation is inevitable as a LAN's capacity increases. This is due to two factors: First, as more Workstations and Servers are added, more traffic flows across the wiring that connects the various computers involved, causing bottlenecks at both Workstations and Servers when attempting to transmit on the LAN. Second, as more network services are used by the Workstations on the LAN, a larger load is placed on the Servers, causing the Servers to be unable to respond to the requests they receive in a timely manner.

There are several solutions to this problem. The first and main current solution to both these problems is the same: to increase the capacity of the of the hardware. In the case of a bottleneck caused by traffic on the LAN, the solution involves increasing the bandwidth (data transfer rate) of the LAN hardware, which entails a purchase of new LAN connection adapters as well as new cabling connecting the various computers on the LAN. In the case of a bottleneck at the LAN Server, the solution involves increasing the capacity of the Server computers or splitting the functionality of a single Server among several.

These hardware solutions are costly to implement, but usually very effective. Other solutions are as costly and more difficult: Re-architecting the LAN software to provide a more optimal data flow, or splitting the LANs up into smaller sub-units that require less inter-LAN communications.

It would be useful therefore to have a software-only solution that does not require a major restructuring of existing software or hardware components of a LAN, but that can reduce LAN traffic, as well as the load on the file servers.

One such software solution, disk caching, has been used extensively in Server design as a method for improving the capacity of a Server machine. Disk caching reduces the load at the Server by maintaining frequently accessed data in a high speed random access memory (RAM) buffer. When such data is requested by a Workstation, the Server can fetch and transmit it more quickly, reducing the work load in the Server, and allowing more such requests to be processed.

A write-caching methodology is also used, although somewhat less widely due to the inherent danger in delaying the permanent storage of data. In this methodology, the Server holds data destined for the Server's hard disk in RAM until such time as demand on the Server is lower. The data can then be written to disk, (a slower process) when the Server is not busy providing services to Workstations.

Caching is possible on the Server because the data is under the single control of the Server's operating system. However, such schemes have not been implemented on the Workstation, because the Server data may be changed by other workstations on the LAN, making the data in a Workstation cache invalid, potentially leading to data damage or loss. Write-caching can cause even more havoc.

SUMMARY OF THE INVENTION

It is an object of the present invention to provide an improved method of transferring data to and from a Server which allows caching to be performed at a Workstation.

It is a further object of the present invention to provide an improved method of transferring data to and from a Server which reduces the load on the Server.

It is yet a further object of the present invention to provide an improved method of transferring data to and from a Server which reduces the processing power requirements of the server by spreading some of the load among Workstations.

These and other objectives, which will become apparent as the invention is described in greater detail are obtained by providing a method which allows Workstations to perform a type of local buffering which is somewhat akin to traditional disk caching.

The invention comprises an input/output file interceptor, a network interceptor and a local storage manager for each workstation. These elements work together to control the accessibility of files to the workstation to insure system-wide file integrity. As used herein, a remote file is of a type amenable to caching in accordance with the invention if it is read-only executable, owned by the local user and local cashing is enabled, or the file being accessed in a non-shared read-only mode.

These discrete functions are performed by the invention. At a first level of operability, remote files requested by a Workstation are examined to determine whether they are to be read or written upon. If it is to be read, the file is "locked" to prevent it being written upon by other facilities. Data from the file is then maintained in a cache in the workstation. When no data for the file is left in the cache, the file lock is removed.

The second level of operation adds control over stand-alone writable files. Once again, access by Other workstations to a file intended to be written to is blocked for so long as the file is being accessed. Because caching at the workstation is used, the issuance of a request for a blocked file causes an inquiry as to its status to be performed, with a purge of the cache if actual use by the workstation has ceased. The file can then be unblocked for a subsequent access.

The third level of operation allows caching of shared files. Once again, upon access the shared file is locked to prevent simultaneous access, and thus possible modification, by another workstation. Here the system locks regions of the file, preventing access until the workstation has finished with the file region and its cache has been emptied. Because the level of implementation can cause significant time to be spent in locking and unlocking the files and broadcast access requests, a further feature of the invention is to provide centralized control over file sharing. The Server is provided with the ability to provide a lock which allows reading but not writing to the file. Such a lock is generated by each Workstation accessing the file. The Server maintains each lock as generated, and denies write access to the file until each lock is removed as a result of the respective Workstations ending their use of the file. The Workstation seeking to access the file for a write activity broadcasts a request, which prompts each of the Workstations which applied a lock to perform an immediate determination as to whether the lock is still needed. The Server processes the resulting unlock commands, and makes the file available when all locks are removed.

A further understanding of the present invention may be achieved upon consideration of the following detailed description of a preferred, but nonetheless illustrative embodiment of the invention, when reviewed in association with the annexed drawings, wherein.

DETAILED DESCRIPTION OF THE INVENTION

In a preferred embodiment, the Server may be a Novell Network File Serve, and the Workstations are personal computers based on Intel architecture microprocessors. Such embodiment is not intended to be limiting, however, as one skilled in the art will appreciate how the inventive technology may be extended to other LANs and computers in a straightforward manner.

Figure 1:
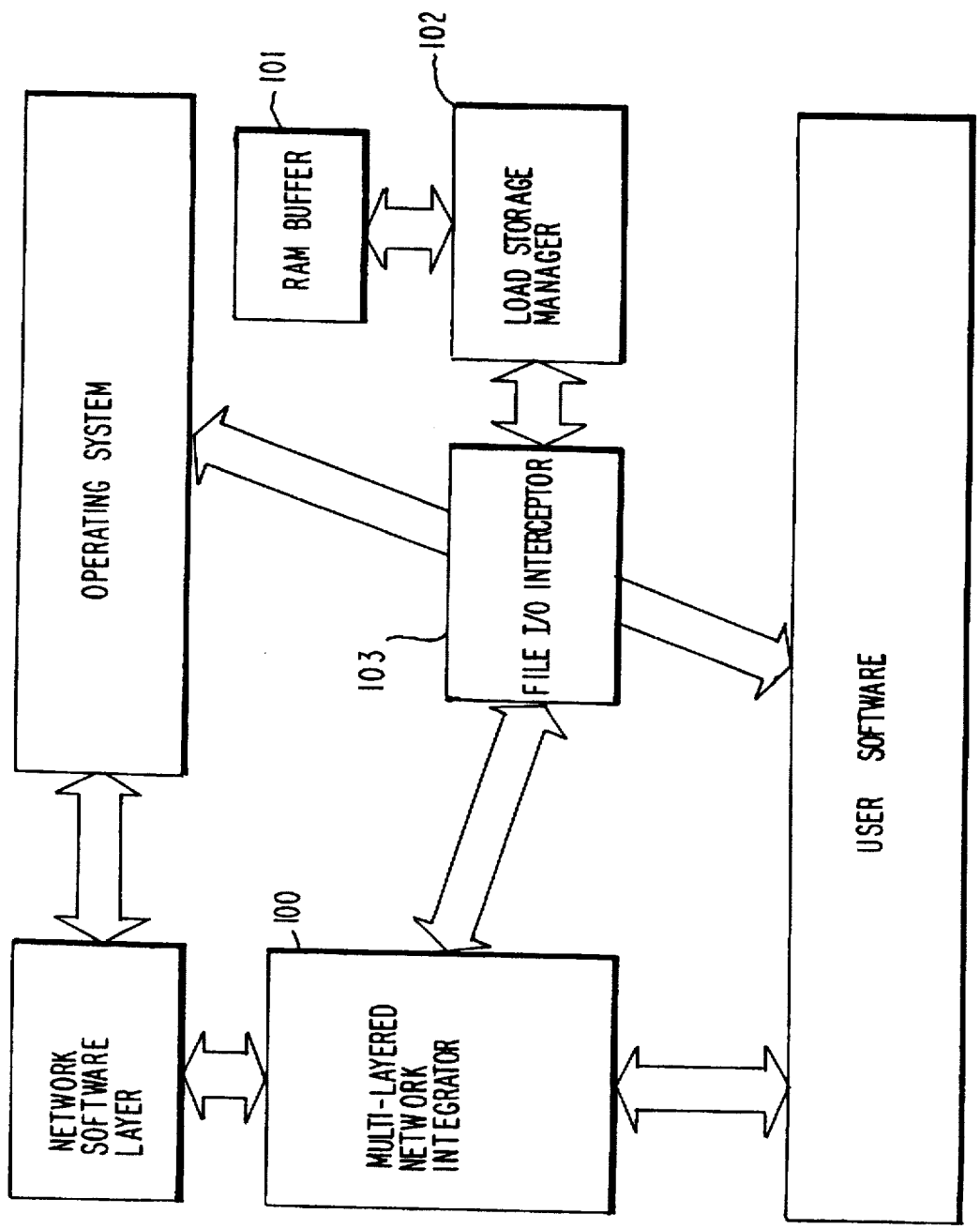
FIG. 1 is a schematic representation of the elements of the present invention.

The methodology of the invention preferably consists of several "layers", each capable of operating independently of its lower layers, but interacting with them if they are present (FIG. 1). The various layers may be separate, or integrated into one program or module, such as multi-layered network interceptor 100. In this way, a Workstation user or Network Administrator may implement the complete functionality of the invention gradually, not needing to upgrade all the Workstations until LAN traffic demands further attention. The first layer implements read caching, and consists of a local memory (RAM or Disk) buffer 101 with a local storage manager program 102, a file I/O interceptor 103, and a Network Interface 100 that prevents data in the cache from becoming obsolete due to modifications made by other users.

The buffer 101 is simply a portion of the Workstation's main system memory, or local hard-disk space used to store data that is actually destined to or from the network. The buffer is controlled by the local storage manager 102 which has sufficient intelligence to discard data on a least-recently-used basis as new data is added to the buffer. Subsequent accesses to the data can be fetched from the local buffer, avoiding the necessity of accessing the Network itself.

The function of the file I/O interceptor 103 is to intercept file I/O requests from the Workstation before they are processed by the LAN file system layer and to cache the I/O requests to/from any given file. The file I/O interceptor must be integrated with and interact with a Network Interface (NI) layer in order to first determine whether the data is cacheable, and then to check whether the data already is in the RAM Buffer and to place it into the Buffer if it is not.

Figure 2:
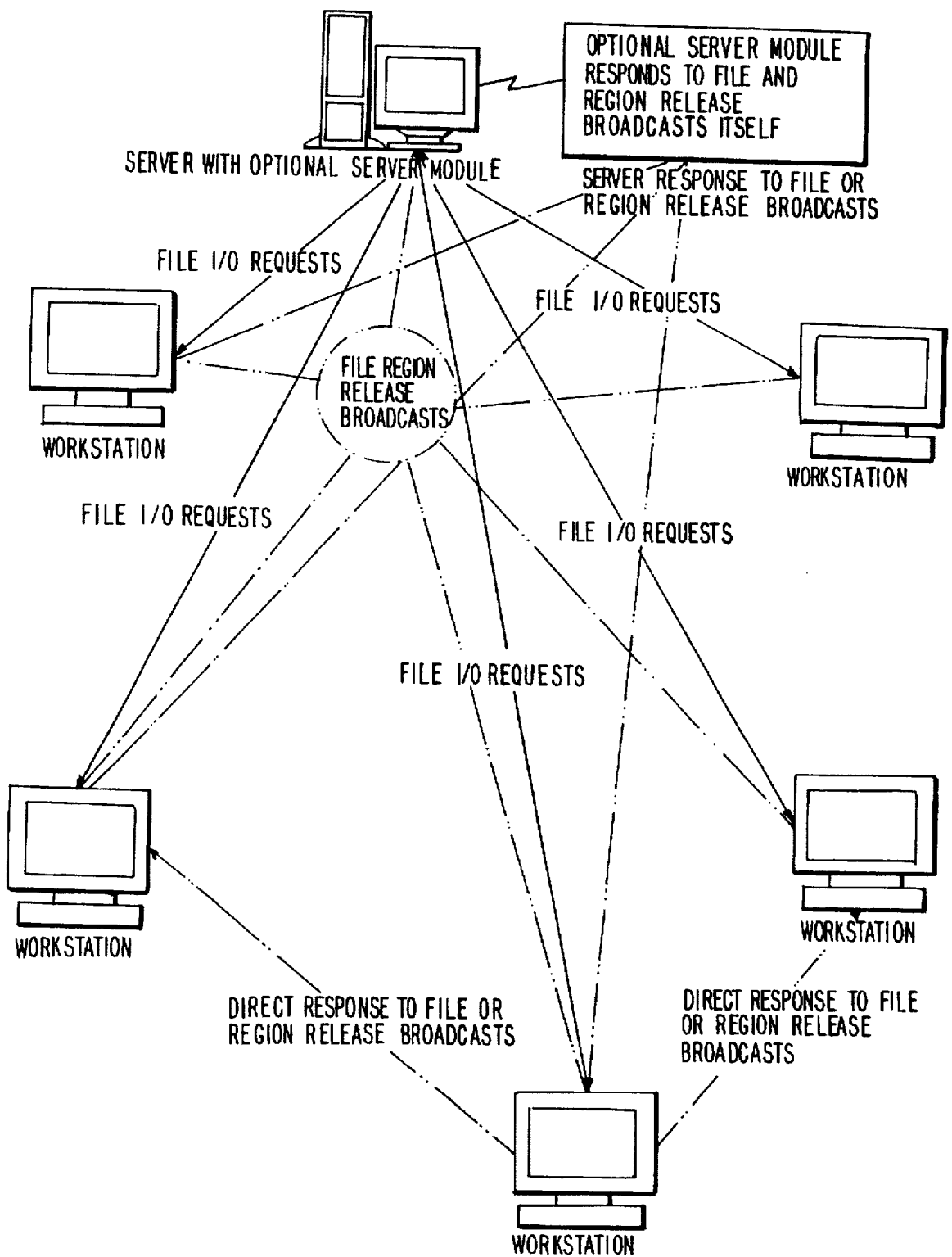
FIG. 2 is a representation of a network depicting the interaction between workstations and a server to which the present invention is addressed.

The function of the NI is to determine, on a file or item basis, what data may be cached so as to maintain network-wide integrity. In the preferred embodiment, the NI is designed to work both on a stand-alone basis in a lower-functionality implementation, and in conjunction with either a Server module or in conjunction with similar Network Interface layers on other workstations, as shown in FIG. 2.

Figure 3:
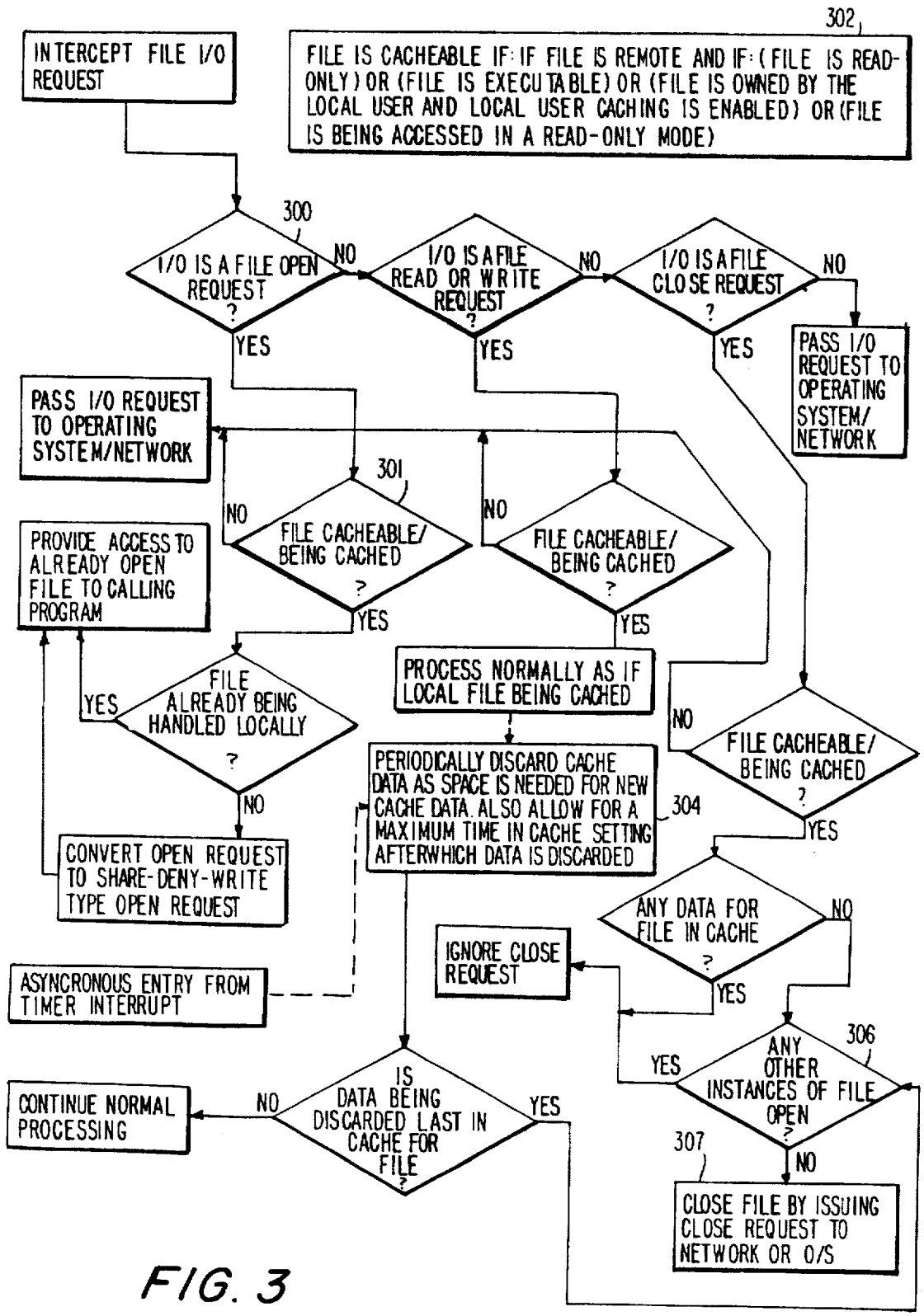
FIG. 3 is a flowchart depicting operation of a Network Interface portion of the invention.

The Network Interface, in it's simplest model (which we call Level 1) protects against modification of a file while it is being read by a Workstation, and interacts with the file I/O interceptor 103 on the following basis as presented in FIG. 3. For each new file that is accessed (300), the NI checks whether the file is local to the Workstation or located at some location remote to the Workstation (301). The NI then determines, for each remote file, whether it is being accessed for read-only operations. That is, whether the intended use will not modify the file's contents.

A file is determined (302) as a read-only file if it is either marked as read-only on the Server, or is being accessed as a program executable file. In the preferred embodiment determination can be made by inspection of the file type. Files with a file type of .exe, .com, .ovl, .dll, .386 or .vxd, in addition to other types of files that may be added by users on a system-by-system basis, are deemed to be read-only. In addition, a file is read-only if it is being opened by the program in read-only or read-deny-write modes, or is marked by the system as belonging exclusively to the user whose Workstation is accessing the file.

Once a new file has been determined as read-only, the NI opens the file using standard methodology. The NI then locks the file using a standard file lock, which prevents the file from being written or deleted, but allows read access (303). If the LAN does not provide for such locking mechanism, the NI instead may set the file's attribute to read-only and keep the file open for the "read-only-shared" access commonly found on all LANs.

The NI keeps the file open and locked (or marked read-only) for as long as there is any data from the file in the local buffer 101. The local storage manager 12 notifies the NI whenever it discards the last bit of data associated with a particular file at 304. Alternately, the NI may poll the local storage manager periodically to determine if there is any data for a particular file left in the buffer. When such data has been discarded (305) AND the file is no longer in use by any user software in the Workstation (306), the NI then removes the lock (or read-only attribute) and closes the file (307).

At this level of implementation, Workstations not using the invention would not be interfered with, except when an attempt is made to delete or write a file that is normally static. When such an attempt was made, the attempt would fail, but the data integrity would be maintained.

Figure 4A:
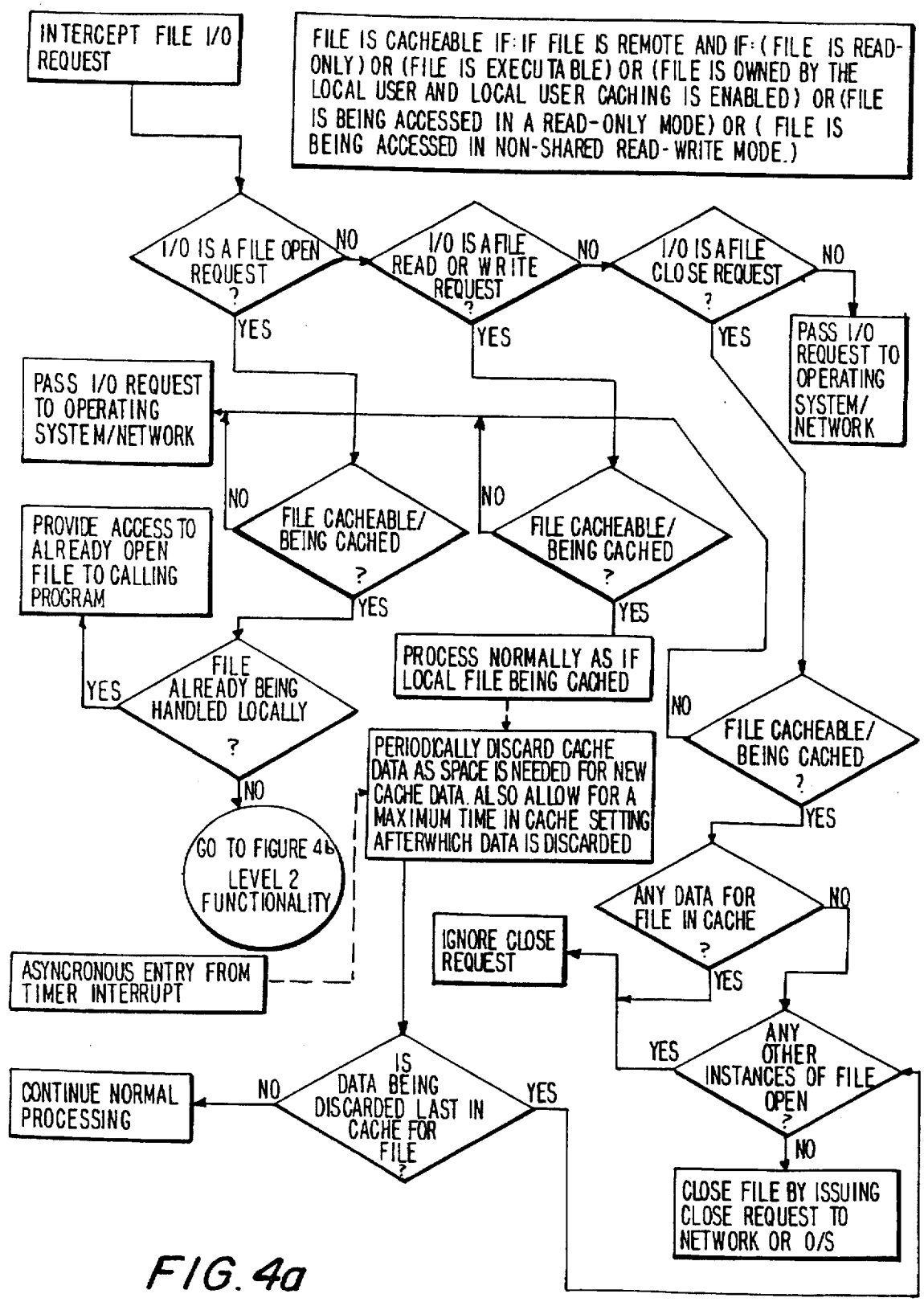
FIGS. 4a and 4b present a flowchart of a second level of implementation of the invention.
Figure 4B:
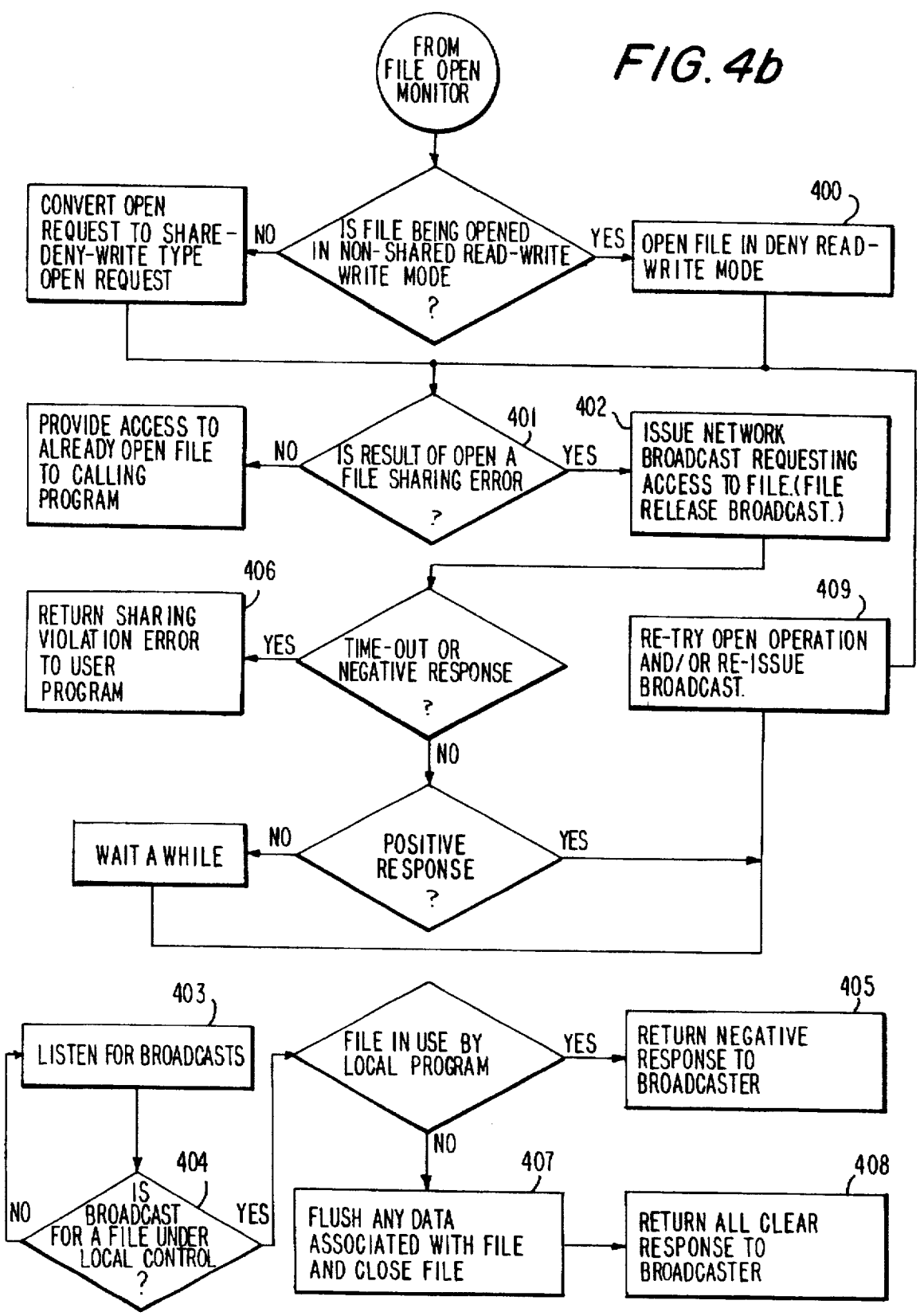

In the next level of implementation, the NI allows caching of writable files (FIGS. 4a, 4b). This is done by creating a LAN-wide interaction between the NIs of the various Workstations on the LAN. The NI in this implementation continues to operate as described above for read-only files in level 1.

Read-write files (those that are not read-only) are typically accessed as either Networked files in which case the software accessing the file is Network-aware, or as non-Networked files, in which case the software accessing the file is treating the file as if it were local to the Workstation. In either case, the NI can determine if the file is being opened by intercepting the file-open operation, which is being done in any case as part of the level 1 procedure. We will refer to networked and files as shared files, and to non-Networked files as stand-alone files.

In level 2, the NI only implements caching for the stand-alone read-write files. For stand-alone files the NI follows a similar procedure as for read-only files, except that the files are marked as non-shareable (400), thus blocking access by all other Workstations while any portion of the file is in the local buffer. Because of the nature of the buffer, this block will likely be in effect even after the user software in the Workstation has finished using the file, causing other Workstations to be unable to access a file that is actually not in use.

To circumvent such sharing errors, the NI of the requesting Workstation must intercept the error return generated by the Network Software on each rejected file access (401). In the event the error return is a sharing error, the NI issues a broadcast (402) on the LAN to all other NIs. An NI receiving such a broadcast (403) examines the file state (404) of all files which have been marked non-sharable. If the file is still in use by the Workstation user, the examining NI sends a direct return message to the broadcasting NI (405), informing the latter that the error should be passed on to the broadcasting NI's Workstation user software (406). If the file is no longer in use by the Workstation, however, the receiving NI removes any of that file's data from the local buffer, then closes the file, removing the sharing lock (407). The receiving NI then responds to the broadcast by sending a directed message to the broadcasting NI, informing it that the file is now available for use (408). The broadcasting NI then proceeds to use the file (409).

With a level 2 implementation, any workstations that do not implement the invention (i.e. do not have an NI cache) would thus get sharing errors, both as they would with level 1, and also when they attempt any kind of access to read-write files that are in the local buffer of any Workstation with an NI cache. However, any user with an NI cache would be able to access a stand-alone read-write file and to over-write or delete any of the read-only files, so long as the files are not actually in use at other Workstations. This maintains data integrity on the LAN.

Shared files are files that can be modified by multiple Workstations simultaneously. Access to such files must be carefully controlled so that no Workstation may access any part of the file that is in the process of being modified by another Workstation. This is accomplished through record locking. A program accessing any data that it is capable of modifying, first locks the data so that other programs cannot access it while it is being modified. For example, if a record in a database is called up by a user in a read-write mode so that the user can change the record, the database software must first lock the record so that no other Workstation can access the record while the user is working on it.

The level 3 NI builds on level 2, adding support for caching such shared files. In a shared file situation, when a user program running on one Workstation locks a record, that record may already reside in the cache of an NI of a second Workstation. If the record gets modified by the first Workstation, the data in the NI cache of the second Workstation becomes obsolete, and access to it would result in the user of the second Workstation viewing out-of-date information when accessing the record. In addition, that out-of-data information has the potential for being written back to the Server, over-writing the correct data.

To prevent out-of-date data from over-writing modifications made by other Workstations, the level 3 NI operates similarly to level 2, but further maintains the record lock on any regions of a file that are in the NI cache. When another NI attempts to access a locked region it will receive a sharing violation. The receiving NI then broadcasts a request to access the region in question, followed by either a re-try or a wait for a reply from the accessed NI. When an NI receives a broadcast regarding a region that is in its own cache but no longer being used, it discards the region from the cache, unlocks it, and replies to the broadcast as in level 2, but at a region level.

The foregoing approach, however, may limit the effectiveness of the NI in situations where several Workstations are simply scanning the data in a shared file. In this event, the various NIs may spend a significant amount of time locking and unlocking the file and broadcasting access requests. To work more efficiently in this situation, a centralized system for enhanced file sharing is added to the Server in the preferred embodiment in a level 4 implementation. This enhanced file sharing system takes the form of a program that must be integrated with the Server software providing new record locking capabilities. For convenience we'll call this part of the system the Server Integrator, or SI. The interaction of the SI and the Server is dictated by the design of the Server software, and can be either an "interceptor" module that filters all server activity, if the Server does not provide any extensibility, or simply a Server extension which provides the functionality through standard means.

The SI's role is to provide a new type of record locking which we call write-allow-read (WAR) locking. Thus, when a Workstation with an NI reads any section of a shared file into its cache, it first WAR-locks that section. Unlike normal record locking, the SI allows WAR-locks to be applied by multiple Workstations, and the SI maintains a WAR-lock count for each region of the file.

When a Workstation attempts to read a WAR-locked region, the read is allowed. However, when a Workstation attempts to lock normally, using standard record-locking, a WAR locked region (as it would prior to going into a modify cycle) the SI rejects the lock attempt with a Sharing Violation error. The NI on the Workstation attempting the lock then broadcasts a region release request, and waits.

The various NIs that may have any part of the region WAR-locked discard the cached data that overlaps any part of the region being requested in the broadcast, and unlock the corresponding part of the region. Since there may be several NIs with the region locked, the NIs do not respond with the go-ahead which can be directly acted upon by the requesting NI. Instead, the SI on the Server tallies the responses decreasing the lock counts for the region. When it reaches a lock count of zero for the region, the SI responds to the broadcasting Workstation with an "all-clear, go ahead" message.

This procedure maintains data integrity by forcing all NIs to discard data that is about to modified by any Workstation on the LAN, while allowing the NIs to maintain as large a cache as possible, and minimizing Network traffic of unlock broadcasts. Furthermore, this system would be transparent to any Workstations that do not have an NI.

The over-all structure of having the NI/SI system implementable in parts is flexibility. A LAN administrator can tailor the complexity and capabilities of the system to the actual LAN usage, so that a system in which each user is treated completely independently with the Server providing simply a central repository for security would be adequately served by a level 1 or 2 NI, reducing the complexity and requirements of the NI software in the Workstation. Furthermore any implementation not requiring an SI would be simpler to develop, and would require less from the LAN administrator.

I claim:

1. A method of storing data obtained from a LAN connection in local storage associated with a Workstation so that subsequent attempts to access the data do not impinge on the LAN, comprising:
   a. a local storage manager cache which maintains data on a least recently used basis in a buffer in local memory or hard disk;
   b. a file I/O trap routine which provides enhanced file level caching through a Network Interface (NI) which allows network caching by:
      (1) examining all I/O requests to any given file by intercepting the I/O requests made by a user program before they are processed by an operating system;
      (2) determining whether a given file I/O request is cacheable by the following logic: If file is determined as remote (determined as residing on any other computer on the LAN) then if the file is cacheable then said determination is affirmative;
      (3) if said determination is affirmative and said file I/O request is a file open request and said file is already under control of the NI (open), returning access to said file to the user program;
      (4) if said determination is affirmative and said file I/O request is a file open request and said file is not already under control of the NI, modifying said file open request to an open request in a mode that allows other LAN users to read the file but not to write or delete it, such as the DOS mode known as the OPEN_SHARE_DENYWRITE mode, or write protecting the file if no such mode is available;
      (5) if said determination result is affirmative and said file I/O is a data read or write request, caching said read or write request using a local storage manager;
      (6) if said determination result is affirmative, and said file I/O request is a file close request, ignoring such close request by not passing said close request to the operating system until such time as all open instances of the file have been closed and there is no longer any data from said file located in the local storage manager; and
      (7) closing said file marked as closed within the NI once no data from said file, as determined by interrogation of or notification from the local storage manager, is located within the local storage manager.

2. The further method of claim 1 comprising:
   a. the additional step of making an affirmative determination in step b(2) of claim 1 if said file therein being opened is being accessed in a non-shared read-write mode; and
   b. step b(5) of claim 1 further consists of modifying the open request of non-shared read-write files to deny access to all others by setting a non-shared mode (or leaving the non-shared mode) such as the DOS mode known as the OPEN_SHARE_DENYREADWRITE mode.

3. The further method of claim 2 comprising:
   a. monitoring the result of open requests in step a of claim 2 and step b(4) of claim 1;
   b. if said result is a sharing violation error, issuing a broadcast on the LAN requesting that said file be released;
   c. waiting for a user definable period, during which additional attempts to open the file are made at a user definable interval and additional file release broadcasts are made;
   d. listening on the Network for NI file release broadcasts, and if the file specified in a received file release broadcast is in use by any local software, responding to said broadcast with a negative response;
   e. listening on the Network for NI file release broadcasts, and if the file specified in a received file release broadcast is not in use by any local software, but is being maintained as open due to data in the local storage in accordance with step b(7) of claim 1, forcing the local storage manager to discard all data associated with said file, and then closing said file as in step b(8) of claim 1 and then responding to said broadcast with a positive response;
   f. listening on the Network for responses to said file release broadcasts, and if said response to said file release broadcast is affirmative, immediately retrying said open request;
   g. listening on the Network for responses to said file release broadcasts, and if said response to said file release broadcast is negative, immediately returning a network sharing violation error to the program issuing said open request; and
   h. if no responses to said file release broadcast are received within a user definable time-out period, returning a network sharing violation error to the program issuing said open request.

4. The further method of claim 3 comprising:
   a. the additional step of making an affirmative determination in step b(2) of claim 1 and/or step a of claim 2 if said file therein being opened is being accessed in any shared read-only or read-write mode;

b. changing step b(5) of claim 1 wherein if said file is being opened in a shared mode, said open request is passed to the operating system unchanged;

c. locking each region of said file being cached through step b(6) of claim 6;

d. unlocking each region of said file that is removed from the local storage as it is removed through the operation of the local manager cache in step a of claim 1;

e. monitoring the result of any read, write or record lock requests issued by user programs within the Workstation;

f. if said result is a sharing violation error, issuing a broadcast on the LAN requesting that the corresponding region to said operation on said file being monitored be released.

g. waiting for a user definable period, during which additional release broadcasts are issued and additional attempts to perform said read, write or record lock operation are made at a user definable interval;

h. listening on the Network for NI file region release broadcasts, and if the file and region specified in said file release broadcast is actually locked by any local software, responding to said broadcast with a negative response;

i. if the file and region specified in said file release broadcast is not locked by any local software, but is being maintained as locked due to data in the local storage in accordance with step c of claim 4, forcing the local storage manager to discard all data associated with said region, and then unlocking said region as in step d of claim 4 and then responding to said broadcast with a positive response;

j. listening on the Network for a response to said region release broadcasts, and if said response to said region release broadcast is affirmative, immediately retrying said read, write or lock request;

k. listening on the Network for a response to said region release broadcasts, and if said response to said region release broadcast is negative, immediately returning a network sharing violation error to the program issuing said read, write or lock request; and l. if no response to said region release broadcast is received within a user definable time-out period, returning a network sharing violation error to the program issuing said read, write or lock.

5. An improved method of record locking provided by a file server for the purpose of enhancing Workstation/Server interaction in a cached environment, consisting of:

a Server enhancement module which provides an enhanced Write-Allow-Read (WAR) record locking mechanism whereby, when a WAR lock is placed on a region of any file, the Server returns a sharing violation error when any Workstation attempts to lock or to write any region which overlaps any WAR locked region; and the Server returns a sharing violation error when any Workstation attempts to delete or rename a file which has any WAR locked regions; the Server allowing and not returning any errors on attempts to read WAR locked regions.

6. The further method of claim 5 wherein:

said Server enhancement module maintains a lock count on each region of the file that is WAR locked.

7. The further method of claim 6 wherein:

a. said Server enhancement monitors the Network for a region release broadcast relating to a region that is WAR locked; and b. said Server enhancement responds affirmatively to said region release broadcast when said region's WAR lock count reaches 0.

8. A system for speeding up Network I/O by storing data obtained from a LAN connection in local storage associated with a Workstation so that subsequent attempts to access the data do not impinge on the LAN, consisting of:

a. a server module that provides WAR record locking;

b. a local storage manager cache which maintains data on a least recently used basis in a buffer in local memory or hard disk;

c. a file I/O trap routine which provides enhanced file level caching through a Network Interface (NI) which allows network caching by:

(1) examining all I/O requests to any given file by intercepting the I/O requests made by user programs before they are processed by an operating system;

(2) determining whether a given file I/O request is cacheable by the following logic: If file is determined as remote (determined as residing on any other computer on the LAN) then said determination is affirmative;

(3) if said determination is affirmative and said file I/O request is a file open request and said file is already under control of the NI (open), returning access to said file to the user program;

(4) if said determination is affirmative and said file I/O request is a file open request and said file is not already under control of the NI, modifying said file open request to an open in a mode that allows other LAN users to read the file by opening the file in a full-sharing mode, such as the DOS mode known as the OPEN_SHARE_DENYNONE mode;

(5) if said determination result is affirmative and said file I/O is a data read or write request, locking the region being read or written using the WAR locking mode, and then caching said read or write request using the local storage manager;

(6) if said determination result is affirmative, and said file I/O request is a file close request, ignoring such close request by not passing said close request to the operating system until such time as all open instances of the file have been closed and there is no longer any data from said file located in the local storage manager;

(7) closing said file marked as closed within the NI once no data from said file, as determined by interrogation of or notification from the local storage manager, is located within the local storage manager;

(8) unlocking, using WAR locking methodology, each region of said file that is removed from the local storage as it is removed through the normal processing of a least recently used algorithm of the local storage manager cache;

(9) monitoring the result of any read, write or record lock requests issued by user programs within the Workstation;

(10) if said result is a sharing violation error, issuing a region release broadcast on the LAN requesting that the corresponding region to said operation on said file being monitored be released;

(11) waiting for a user definable period, during which additional region release broadcasts and additional attempts to perform said read, write or record lock operation are made at a user definable interval;

(12) listening on the Network for NI file region release broadcasts, and if the file and region specified in said file release broadcast is actually locked by any local software, responding to said broadcast with a negative response;

(13) if the file and region specified in said file release broadcast is not locked by any local software, but is being maintained as WAR locked due to data in the local storage in accordance with claim step c(6), forcing the local storage manager to discard all data associated with said region, and then unlocking said region as in step c(8);

(14) listening on the Network for a response to said region release broadcasts, and if said response to said region release broadcast is affirmative, immediately retrying said read, write or lock request;

(15) listening on the Network for a response to said region release broadcasts, and if said response to said region release broadcast is negative, immediately returning a network sharing violation error to the program issuing said read, write or lock request; and

(16) if no response to said region release broadcast is received within a user definable time-out period, returning a network sharing violation error to the program issuing said read, write or lock.

9. A method of storing data obtained from a LAN connection in local storage associated with a Workstation so that subsequent attempts to access the data do not impinge on the LAN, comprising:

a. a local storage manager cache which maintains data on a least recently used basis in a buffer in local memory or hard disk;

b. a file I/O trap routine which provides enhanced file level caching through a Network Interface (NI) which allows network caching by:

(1) examining all I/O requests to any given file by intercepting the I/O requests made by a user program before they are processed by an operating system; and (2) determining whether a given file I/O request is cacheable by the following logic: if file is determined as remote (determined as residing on any other computer on the LAN) then if the file is cacheable said determination is affirmative.

10. The method of claim 9 further comprising the step of, if said determination is affirmative and said file I/O request is a file open request and said file is already under control of the NI (open), returning access to said file to the user program.

11. The method of claim 9 further comprising the step of, if said determination is affirmative and said file I/O request is a file open request and said file is not already under control of the NI, modifying said file open request to an open request in a mode that allows other LAN users to read the file but not to write or delete it, such as the DOS mode known as the OPEN_SHARE_DENYWRITE mode, or write protecting the file if no such mode is available.

12. The method of claim 9 further comprising the step of, if said determination result is affirmative and said file I/O is a data read or write request, caching said read or write request using a local storage manager.

13. The method of claim 9 further comprising the step of, i.e. said determination result is affirmative and said file I/O request is a file close request, ignoring such close request by not passing said close request to the operating system until such time as all open instances of the file have been closed and there is no longer any data from said file located in the local storage manager.

14. The method of claim 13 further comprising the step of closing said file marked as closed within the NI once no data from said file, as determined by interrogation of or notification from the local storage manager, is located within the local storage manager.

15. A system for speeding up Network I/O by storing data obtained from a LAN connection in local storage associated with a Workstation so that subsequent attempts to access the data do not impinge on the LAN, consisting of:

a. a server module that provides WAR record locking;

b. a local storage manager cache which maintains data on a least recently used basis in a buffer in local memory or hard disk;

c. a file I/O trap routine which provides enhanced file level caching through a Network Interface (NI) which allows network caching by:

(1) examining all I/O requests to any given file by intercepting the I/O requests made by user programs before they are processed by an operating system; and (2) determining whether a given file I/O request is cacheable by the following logic: If file is determined as remote (determined as residing on any other computer on the LAN) then said determination is affirmative.

16. The system of claim 15 further comprising the step of, if said determination is affirmative and said file I/O request is a file open request and said file is already under control of the NI (open), returning access to said file to the user program.

17. The system of claim 15 further comprising the step of, if said determination is affirmative and said file I/O request is a file open request and said file is not already under control of the NI, modifying said file open request to an open in a mode that allows other LAN users to read the file by opening the file in a full-sharing mode, such as the DOS mode known as the OPEN_SHARE_DENYNONE mode.

18. The system of claim 15 further comprising the step of, if said determination result is affirmative and said file I/O is a data read or write request, locking the region being read or written using the WAR locking mode, and then caching said read or write request using the local storage manager.

19. The system of claim 18 further comprising the step of unlocking, using WAR locking methodology, each region of said file that is removed from the local storage as it is removed through the normal processing of a least recently used algorithm of the local storage manager cache.

20. The system of claim 18 further comprising the step of listening on the Network for NI file region release broadcasts, and if the file and region specified in said file release broadcast is actually locked by any local software, responding to said broadcast with a negative response.

21. The system of claim 20 further comprising the step of, if the file and region specified in said file release broadcast is not locked by any local software, but is being maintained as WAR locked due to data in the local storage, forcing the local storage manager to discard all data associated with said region, and then unlocking said region using WAR locking methodology.

22. The system of claim 20 further comprising the step of listening on the Network for a response to said region release broadcasts, and if said response to said region release broadcast is affirmative, immediately retrying said read, write or lock request.

23. The system of claim 20 further comprising the step of listening on the Network for a response to said region release broadcasts, and if said response to said region release broadcast is negative, immediately returning a network sharing violation error to the program issuing said read, write or lock request.

24. The system of claim 20 further comprising the step of if no response to said region release broadcast is received within a user definable time-out period, returning a network sharing violation error to the program issuing said read, write or lock.

25. The system of claim 15 further comprising the step of, if said determination result is affirmative, and said file I/O request is a file close request, ignoring such close request by not passing said close request to the operating system until such time as all open instances of the file have been closed and there is no longer any data from said file located in the local storage manager.

26. The system of claim 25 further comprising the step of closing said file marked as closed within the NI once no data from said file, as determined by interrogation of or notification from the local storage manager, is located within the local storage manager.

27. The system of claim 15 further comprising the step of monitoring the result of any read, write, or record lock requests issued by user programs within the Workstation.

28. The system of claim 27 further comprising the step of, if said result is a sharing violation error, issuing a region release broadcast on the LAN requesting that the corresponding region to said operation on said file being monitored be released.

29. The system of claim 28 further comprising the step of waiting for a user definable period, during which additional region release broadcasts and additional attempts to perform said read, write or record lock operation are made at a user definable interval.

* * * * *